United States Patent [19]

Jaye, Jr.

[11] 4,209,489
[45] Jun. 24, 1980

[54] APPARATUS FOR TREATING SPENT HYDROCHLORIC ACID

[76] Inventor: Frederick O. Jaye, Jr., 819 Crossroads Dr., Houston, Tex. 77079

[21] Appl. No.: 962,051

[22] Filed: Nov. 20, 1978

Related U.S. Application Data

[60] Division of Ser. No. 852,314, Nov. 17, 1977, abandoned, which is a continuation-in-part of Ser. No. 666,147, Mar. 11, 1976, abandoned.

[51] Int. Cl.² .............................. C01B 7/08; B01J 1/00
[52] U.S. Cl. ..................................... 422/106; 422/187; 422/189; 422/234; 423/144
[58] Field of Search ............... 422/187, 106, 234, 169, 422/189, 230, 231; 423/144

[56] References Cited

U.S. PATENT DOCUMENTS

| | | | |
|---|---|---|---|
| 2,192,094 | 2/1940 | Moore | 422/106 |
| 2,416,744 | 3/1947 | Francis | 423/144 |
| 2,761,882 | 9/1956 | Halse et al. | 422/234 X |
| 2,939,763 | 6/1960 | Cooper | 423/144 |
| 2,955,123 | 10/1960 | Favis | 422/189 X |
| 3,335,158 | 8/1967 | Goldsmith | 422/234 |
| 3,495,945 | 2/1970 | Allison | 422/234 |

*Primary Examiner*—Michael S. Marcus
*Attorney, Agent, or Firm*—Bard & Groves

[57] ABSTRACT

Apparatus for treating spent hydrochloric acid from a galvanizing pickling bath wherein the spent acid is neutralized with ammonium hydroxide and aerated to form a solution of ammonium chloride with suspended iron oxides and hydroxides. The ammonium chloride solution, freed of the magnetite, is usable as a recycle material in the galvanizing process.

3 Claims, 1 Drawing Figure

APPARATUS FOR TREATING SPENT HYDROCHLORIC ACID

RELATED APPLICATIONS

This application is a division of application Ser. No. 852,314, filed Nov. 17, 1977, which in turn is a continuation-in-part of application Ser. No. 666,147, filed Mar. 11, 1976, and both of which are now abandoned.

BACKGROUND OF INVENTION

This invention relates to a process for treating spent hydrochloric acid from a galvanizing acid or pickling bath, in which chemical changes occur causing removal or certain undesirable contaminants as well as conversion of the acid into a material usable in the preflux section of the galvanizing system. In one specific aspect, it relates to a process for treating spent hydrochloric acid and forming therefrom two useful products, one being ammonium chloride which may be recycled to the galvanizing preflux section, and the other being magnetite which is useful as a paint pigment, or as an addition in cattle feed.

In conventional galvanizing systems, the metal to be coated undergoes five distinct treatments. Initially, the metal is passed through a caustic bath where oils and greases are eliminated and the metal is thoroughly washed clean. A typical caustic used in this first stage bath is sodium hydroxide. From the first stage caustic bath the cleaned metal is passed to a second stage water rinse bath where caustic from the first bath is removed. The third stage bath in the process commonly contains an acid such as hydrochloric acid. This third stage bath is termed the pickling bath. It is in this third stage bath that the surface preparation of the metal to be galvanized occurs. Thus the pickling bath removes iron oxide from the metal object to be galvanized. From the pickling bath, the metal object passes to a fourth stage bath termed the preflux bath. This bath conventionally contains a solution of ammonium chloride and zinc chloride, and in this preflux bath the metal object undergoes secondary surface preparation where ammonium chloride and zinc ammonium chloride acting as a wetting agent are added to the surface of the metal object. The fifth and final conventional treatment bath in the galvanizing process is the galvanizing tank commonly containing molten zinc for application as a coating on the metal object having the surface thereof prepared as previously described in the initial four treatment stages.

Heretofore, it has been common in conventional galvanizing systems for the hydrochloric acid in the pickling bath to become spent or unusable. Thus, after many hours of operation, the pickling acid increases in iron concentration and increases in water concentration. When the iron concentration for example reaches approximately 9% by weight, and when the increase in water concentration drops the Baume of the pickling acid to 10°–12°, it has been necessary to drain and dispose of the spent acid in the pickling tank, and to recharge the pickling tank with fresh acid. This has resulted in increased expenditures for draining and recharging and has presented spent acid disposal problems. Thus, in conventional galvanizing systems, the spent acid has been drained from the pickling bath and pumped to a tank truck for transportation and ultimate disposal by means which, according to present day environmental regulations, are prohibited. Hence, previous attempts to deal with the problem of spent pickling acid have not only proved to be unsuccessful but also laborious and time consuming.

SUMMARY OF INVENTION

A brief explanation of the chemistry of what occurs in the pickling bath and in the process according to this invention is necessary in order to understand the invention.

In the galvanizing pickling bath, the hydrochloric acid reacts with the scale on the metal object to be treated to form ferrous chloride expressed by the following equations:

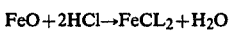
$$FeO + 2HCl \rightarrow FeCL_2 + H_2O$$

When the acid activity of the hydrochloric acid has been diluted to an ineffective level rendering the acid spent by the build-up of the iron compound and by the dilution of water, the pickling acid must be replaced with fresh acid. It is proposed, however, according to the present invention to treat the spent acid in the following fashion rather than to dispose of the acid. First, the spent acid is neutralized with ammonium hydroxide as expressed by the following equations:

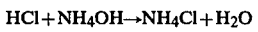
$$HCl + NH_4OH \rightarrow NH_4Cl + H_2O$$

$$FeCL_2 + 2NH_4OH \rightarrow Fe(OH)_2 + 2NH_4Cl$$

The resulting solution of ammonium chloride at this stage contains the soluble ferrous hydroxide iron salt contaminate and, hence, the solution at this point is not suitable for use as a recycle product to the preflux bath of the galvanizing system. In order to remove this iron salt contaminate, the ammonium chloride solution containing the ferrous hydroxide contaminate is oxygenated to convert the soluble iron salt to the insoluble salt magnetite, as for example:

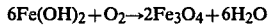
$$6Fe(OH)_2 + O_2 \rightarrow 2Fe_3O_4 + 6H_2O$$

After conversion of the soluble iron salt, $Fe(OH)_2$, to the insoluble salt $Fe_3O_4$, the iron compound is separated from the ammonium chloride solution. This separation may be achieved by any of known techniques, for example, centrifugation, gravity settling, or filtration. The ammonium chloride solution thus freed of the iron salt contaminate may be recycled to the preflux section of the galvanizing system for reuse, or pumped to a storage tank for use at some later time. The solid iron salt, $Fe_3O_4$, from the separation process may be subsequently dried or freed of water by common techniques of evaporation, for ultimate use as either a land fill material or as a paint pigment.

Quite surprisingly, I have discovered a new, successful method of treating spent pickling acid with ammonium hydroxide and oxygen. When the spent acid is treated according to my process, we have been able to obtain two useful products, and save time and labor by making disposal of the spent acid unnecessary. At the same time, I have obtained no harmful side effects of the disposition of spent acid in a manner contrary to present day environmental prohibitions.

It is therefore an object of my invention to provide a new method of treating spent hydrochloric pickling acid with ammonium hydroxide and oxygen.

It is another object of my invention to provide a new method of treating spent hydrochloric pickling acid with ammonium hydroxide and oxygen which results in two useful products.

It is a further object of my invention to provide a new method of treating spent hydrochloric pickling acid with ammonium hydroxide and oxygen which results in a contaminate-free ammonium chloride solution which may be recycled or stored for use in the preflux section of the galvanizing process.

It is a still further object of my invention to provide a new method of treating spent hydrochloric pickling acid with ammonium hydroxide and oxygen which results in an iron by-product which is useful as a land fill material or as a paint pigment.

In accordance with the invention, I have discovered a new method of treating spent hydrochloric acid with ammonium hydroxide and oxygen whereby precipitation of iron contaminates in the resulting ammonium chloride solution is achieved, and wherein both the solution and the precipitated product have utility.

Oxygenation of the contaminated neutralized solution of ammonium chloride may be carried out by any one of three techniques. First, the solution may be artificially impregnated with oxygen by aerating the solution via a porous diffuser or sparger unit. This method of oxygenation is by far the most economical source of oxygen. A second method of oxygenation involves the introduction of hydrogen peroxide into the solution. According the this method, the hydrogen peroxide in solution decomposes into water and oxygen. The third oxygenation technique that may be used according to this invention is ozonation. Ozone, having the chemical formula $O_3$, is a powerful oxidizing agent. In solution, one of the oxygens is reduced to water and the other two are liberated as molecular oxygen. Its outstanding feature is that it has no effect on the pH of the solution to be treated. The ozone used to treat the solution in my invention may be supplied by any commercial source, such as an ozone generator. From the generator, the ozone gas passes through the reaction tank containing the solution.

In the method according to my invention, the spent hydrochloric acid is pumped from the pickling bath of the galvanizing system into a reaction tank. A continuous circulation of the material in the reaction tank is maintained by appropriate and conventional pumping and valve arrangements. The acid in the reaction tank is mixed with and neutralized by the slow addition of ammonium hydroxide. Ammonium hydroxide is added until a pH of 8.5 to 9.0 is reached. Continuous circulation of the material in the reaction tank is maintained during the addition of ammonium hydroxide. The resulting neutralized solution of ammonium chloride contaminated with ferrous hydroxide is then oxygenated by one of the above described techniques, preferably aeration, although the addition of hydrogen peroxide or ozone is contemplated herein. Aeration is preferred due to simplicity and for economic reasons. Completion of the oxygenation reaction resulting in the precipitation of insoluble magnetite is determined by standard color test indicators. The resulting solution in the reaction tank is then pumped to a suitable separating device wherein solid magnetite is withdrawn, and a solution of ammonium chloride containing less than one percent iron remains. The reusable product of the ammonium chloride solution has been found to possess a Baume of 7° to 10°.

The time required for completion of the neutralization and oxygenation reactions varies with the type of spent acid being treated, but usually four to eight hours has been found to produce satisfactory results.

The effective temperature range of my invention is between 60° F. and 160° F., and the particular temperature may be adjusted. The preferred temperature is about 90° F.

The pressure under which the spent acid treatment is conducted is atmospheric.

DRAWINGS

The accompanying drawing is only for the purpose of illustration and shows an embodiment of the invention. The drawing shows, in simplified form, a system for treating spent hydrochloric pickling acid with ammonium hydroxide and oxygen.

DETAILED DESCRIPTION

Figure 1:
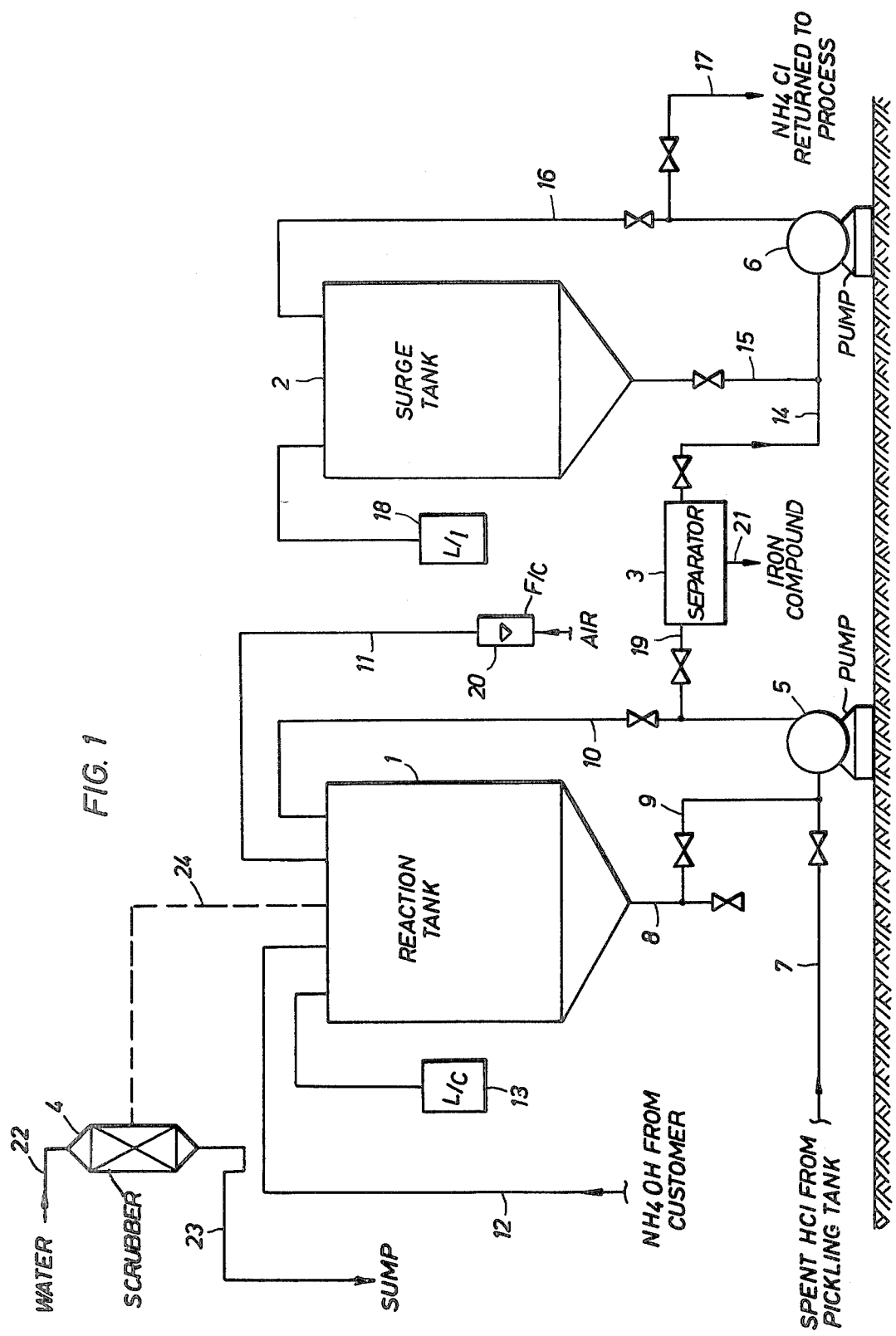

Referring to the drawing, spent hydrochloric acid from the pickling tank or from an intermediate storage facility is passed through line 7 and is forced under pressure produced by pump 5 into reaction tank 1 via line 10. Pumping is continued until the desired amount or level is reached in reaction tank 1, as indicated for example by conventional level controllers or indicators 13. Once the desired amount of spent acid is present in reaction tank 1, a closed and continuous circulation system is set up by communicating line 9 with pump 5. Thus, material in tank 1 is circulated in a continuous fashion from the bottom of tank 1, into line 9, passed through pump 5 and back into tank 1 via line 10. This continuous circulation aids in mixing and promoting the reaction of the constituents in tank 1 and is maintained for the course of the treatment, including neutralization and oxygenation. Ammonium hydroxide is then added slowly to the spent acid in reaction tank 1 by means of line 12. When the pH of the reaction solution has reached 8.5 to 9.0, oxygen is supplied to reaction tank 1 by means of flow line 11. In the case of oxygenation by aeration as illustrated, this may comprise an air flow control device for supplying air under pressure to a conventional porous diffuser or sparger unit located in reaction tank 1 and being in direct communication with line 11. If hydrogen peroxide or ozone is used, suitable well-known connections to line 11 may be made to convey these materials to tank 1. During the course of the reaction, some ammonia gas may be generated. In order to handle removal of ammonia, a suitable scrubber unit 4 communicates with reaction tank 1 via line 24. Water is introduced into the scrubber unit 4 by line 22, and an ammoniated water solution is removed from scrubber 4 and passed to a suitable sump by line 23. At the end of the oxygenation reaction, air supply 20 is shut off and the material in tank 1 is pumped to separator unit 3 via lines 9 and 19. This separator unit may comprise a solid bowl centrifugal device or other conventional solid-liquid separating apparatus such as gravity settling tanks or filter units. The solid magnetite compound is removed at 21 and may be further dried for ultimate use as a land fill material or paint pigment. Effluent from the separator, in this case a solution of ammonium chloride, is passed through line 14 to surge tank 2 for storage by means of pump 6 and line 16. If the need for the solution in the preflux bath of the galvanizing system is immediate, surge tank 2 may be by-passed with the solution being sent directly to the preflux bath by line 17. If stored for any period of time, surge tank 2 is equipped with a drain line 15 for directing the solution to the galvanizing system when needed by pump 6 and line 17.

Surge tank 2 also includes conventional level controlling and indicating devices 18. It is contemplated that the illustrated system may be adapted to batch treatment or continuous treatment of the spent acid. Such adaptation of the disclosed system is deemed to be within the scope of those skilled in the art. It is further contemplated that separator unit 3 may be eliminated and that a gravity separation of the magnetite from the ammonium chloride solution be effected in reaction tank 1. In this case, line 8 is provided. Other conventional modifications of piping, valving, pumping, bypassing, level control and indication, and sample taking and testing systems are contemplated herein.

The invention is further illustrated by the following example.

EXAMPLE

Reaction tank 1 was charged with 250 gallons of spent hydrochloric pickling and 250 gallons of ammonium hydroxide solution (25%NH$_3$). A solution pH 8.5 to 9.0 was reached. Circulation of the contents of tank 1 was continued for 15 minutes. The resulting neutralized solution of ammonium chloride containing insoluble contaminant ferrous hydroxide was then aerated for two hours with 4–5 cubic feet per minute of air. Test samples were withdrawn from reaction tank 1 and color indicator tests were run using indicator compound 1,10-phenanthroline. A pale pink color indicated completion of the reaction. A red color indicated incompleteness, and aeration was continued until completion of the reaction was dicated by the color test. The material in reaction tank 1 was pumped to separator unit 3, and the resulting separation yielded 500 pounds of a solution of ammonium chloride in 300 l gallons of water and 175 pounds of magnetite. The ammonium chloride solution was found to contain less than one percent iron and was thus suitable for use in the preflux tank of the galvanizing system. It further had a Baume of between 10° to 12°. The solid magnetite was further treated to remove excess water to dryness, and was found suitable for use as a paint pigment.

Although the invention has been described in terms of specific embodiments which are set forth in detail, it should be noted and understood that this is by way of illustration only and that the invention is not necessarily limited thereto, since alternative embodiments will become apparent to those skilled in the art in view of the disclosure. Accordingly, modifications are contemplated which can be made without departing from the spirit of the described invention.

Having now described the invention, what I claim as new and desire to secure by Letters Patent is:

1. Apparatus for treating spent hydrochloric acid comprising:

reaction tank means (1) for converting spent hydrochloric acid into a mixture of ammonium chloride solution and magnetite, flow means (12) for feeding ammonium hydroxide to the top of said tank to neutralize said spent acid to a pH of between about 8.5 and 9.0 and forming a mixture of ammonium chloride and ferrous hydroxide, first pump means (5) having an inlet conduit means (7) in communication with a pickling bath containing spent HCL having an iron concentration of about nine percent by weight and a Baume of about 10°–12°, and a recirculation outlet means (10) in communication with the top of said reaction tank for delivering spent HCL thereto, solids withdrawal means (8) in communication with the bottom of said reaction tank and including means (9) for directing materials in said reaction tank to said inlet conduit means (7), means (11) for feeding air to said reaction tank to convert the ferrous hydroxide therein to magnetite, said air feeding means (11) including flow control means (20) for regulating the supply of air to said reaction tank to about 4–5 cubic feet per minute, a scrubber means (4) having a supply line (22) for delivering water thereto, a feed line (24) in communication with the top of said reaction tank for directing ammonia gas liberated in said reaction tank to said scrubber means, and a sump line (23) for the exit of an ammoniated water solution from said scrubber means, control means (13) connected to said reaction tank for maintaining a predetermined level of liquid in said reaction tank, separating means (3) having an outlet means (21) for solids removal, an inlet means (19) connected to and communicating with said recirculation outlet means (10), and a solution outlet means (14), a surge tank (2) having an outlet means (15) connected to and communicating with said outlet means (14), second pump means (6) having an inlet end connected to and communicating with said outlet means (14), said pump means connected downstream of the intersection of outlet means (14) and (15), a recirculation line (16) connected to and communicating with the outlet end of said second pump means and the top of said surge tank, and further comprising a recirculation line (17) for returning ammonium chloride solution to a preflux section, and second control means (18) connected to said surge tank for maintaining a predetermined level of liquid in said surge tank.

2. The apparatus of claim 1 wherein said separating means comprises a centrifuge.

3. The apparatus of claim 1 wherein said separating means comprises a gravity settling tank.

* * * * *